United States Patent
Tanio et al.

(10) Patent No.: US 8,568,201 B2
(45) Date of Patent: Oct. 29, 2013

(54) METHOD AND APPARATUS FOR GRINDING AXIAL WORKPIECES

(75) Inventors: Masayuki Tanio, Shizuoka-ken (JP);
Akiyoshi Muto, Shizuoka-ken (JP)

(73) Assignee: NTN Corporation, Osaka-fu (JP)

( * ) Notice: Subject to any disclaimer, the term of this patent is extended or adjusted under 35 U.S.C. 154(b) by 913 days.

(21) Appl. No.: 11/791,971

(22) PCT Filed: Jun. 5, 2006

(86) PCT No.: PCT/JP2006/311212
§ 371 (c)(1),
(2), (4) Date: Jul. 2, 2009

(87) PCT Pub. No.: WO2007/007485
PCT Pub. Date: Jan. 18, 2007

(65) Prior Publication Data
US 2011/0136409 A1 Jun. 9, 2011

(30) Foreign Application Priority Data
Jul. 11, 2005 (JP) ................................. 2005-201936

(51) Int. Cl.
*B24B 49/00* (2012.01)
*B24B 1/00* (2006.01)

(52) U.S. Cl.
USPC .............................................. 451/11; 451/49

(58) Field of Classification Search
USPC ................. 451/49, 57, 62, 5, 11, 48
See application file for complete search history.

(56) References Cited

U.S. PATENT DOCUMENTS

| 4,930,265 | A | * | 6/1990 | Belthle | 451/11 |
| 5,392,566 | A | * | 2/1995 | Wedeniwski | 451/5 |
| 5,533,931 | A | * | 7/1996 | Imai et al. | 451/11 |
| 6,409,573 | B1 | * | 6/2002 | Mukai et al. | 451/5 |

(Continued)

FOREIGN PATENT DOCUMENTS

| JP | 57-205068 | 12/1982 |
| JP | 63-062650 | 3/1988 |

(Continued)

OTHER PUBLICATIONS

Supplementary European Search Report dated Nov. 12, 2009 in corresponding European Application No. 06766449.

(Continued)

*Primary Examiner* — Dung Van Nguyen
(74) *Attorney, Agent, or Firm* — Wenderoth, Lind & Ponack, L.L.P.

(57) ABSTRACT

A method and an apparatus for grinding an axial workpiece are capable of removing a turning lead portion of an axial workpiece having an oil seal fit portion on its outer circumferential surface by grinding without any grinding fluid. The apparatus includes a headstock of a lathe for rotatably supporting an axial workpiece about its axis, the workpiece having an oil seal fit portion on its outer circumferential surface, and a slide mount disposed so as to be radially movable with respect to a tool turret of the lathe. The apparatus also includes an air cylinder for moving the slide mount back and forth in alignment with the axis of the headstock, an elastic grinding stone wheel rotatably attached to the slide mount to be movable radially back and forth with respect to the oil seal fit portion by the slide mount being moved, and a brushless motor for rotating the elastic grinding stone wheel.

2 Claims, 2 Drawing Sheets

(56) References Cited

U.S. PATENT DOCUMENTS

| 6,419,563 | B1 * | 7/2002 | Ido et al. | 451/57 |
| 6,511,364 | B2 * | 1/2003 | Ido et al. | 451/10 |
| 7,037,173 | B2 * | 5/2006 | Nonoyama et al. | 451/5 |
| 7,147,547 | B2 * | 12/2006 | Junker | 451/57 |

FOREIGN PATENT DOCUMENTS

| JP | 01210256 A * | 8/1989 |
| JP | 8-215999 | 8/1996 |
| JP | 2000-62342 | 2/2000 |
| JP | 2000-062343 | 2/2000 |
| JP | 2001-079761 | 3/2001 |
| JP | 2002-086361 | 3/2002 |
| JP | 2002-103219 | 4/2002 |
| JP | 2002-160133 | 6/2002 |

OTHER PUBLICATIONS

Japanese Office Action issued Dec. 22, 2011 in corresponding Japanese Patent Application No. 2005-201936 w/partial English translation.

Japanese Office Action issued Apr. 26, 2011 in corresponding Japanese Patent Application No. 2005-201936 w/partial English translation.

* cited by examiner

METHOD AND APPARATUS FOR GRINDING AXIAL WORKPIECES

BACKGROUND OF THE INVENTION

1. Field of the Invention

The present invention relates to a method and an apparatus for grinding axial workpieces, and in particular, to a method and an apparatus for grinding an axial workpiece having an oil seal fit portion on its outer circumferential surface to remove a turning lead portion thereof by dry process within a lathe.

2. Description of the Related Art

A number of constant velocity joints and other various types of automobile components include those axial parts that have an oil seal fit portion on their outer circumferential surface. Such axial parts are typically formed by grinding, but when formed by turning using a lathe, they may have somewhat coarse turning lead portions remaining at their oil seal fit portion. Such a remaining coarse turning lead portion may likely cause leakage of oil along the turning lead portion. Accordingly, the oil seal fit portion is generally finished by grinding to remove the turning lead portion.

However, in general, grinding fluid such as mineral oil is indispensable for grinding in order to prevent burning due to grinding. Use of grinding fluid causes deterioration of work environment due to scattering of the fluid or an increase in costs for treatment of used fluids. In these days, to solve such problems with grinding fluids, there is an increasing tendency to process some workpieces by dry cutting without any grinding fluid instead of grinding with grinding fluid. However, in an outer-diameter finish step for axial parts having an oil seal fit portion on their outer circumferential surface, it is difficult to generally employ dry processing by entirely changing grinding to cutting because there will still be a possibility that a coarse turning lead portion inevitably remains.

SUMMARY OF THE INVENTION

The present invention has been developed in view of the aforementioned problems. It is therefore an object of the present invention to provide a method and an apparatus for grinding, the method and the apparatus being capable of removing a turning lead portion of an axial workpiece having an oil seal fit portion on its outer circumferential surface by grinding without any grinding fluid.

A first aspect of the present invention relates to an apparatus for grinding an axial workpiece. The apparatus includes a headstock for rotatably supporting an axial workpiece about its axis, the workpiece having an oil seal fit portion on its outer circumferential surface; and an elastic grinding wheel for finishing the oil seal fit portion, the wheel being disposed to be movable radially back and forth with respect to the oil seal fit portion.

A second aspect of the present invention embodies the invention according to the first aspect as an apparatus. The apparatus includes: a headstock of a lathe for rotatably supporting an axial workpiece about its axis, the workpiece having an oil seal fit portion on its outer circumferential surface; a slide mount disposed so as to be radially movable with respect to a tool turret of the lathe; first drive means for moving the slide mount back and forth in alignment with the axis of the headstock; an elastic grinding stone wheel rotatably attached to the slide mount to be movable radially back and forth with respect to the oil seal fit portion by the slide mount being moved; and second drive means for rotating the elastic grinding stone wheel.

A third aspect of the present invention relates to a method for grinding an axial workpiece. The method include: cutting an oil seal fit portion of an axial workpiece with a cutting tool attached to the tool turret of the grinding apparatus in accordance with the second aspect of the invention, the oil seal fit portion being formed on an outer circumferential surface of the axial workpiece; rotating the tool turret to face the elastic grinding stone wheel to the oil seal fit portion of the axial workpiece; bringing the elastic grinding stone wheel into contact with the oil seal fit portion; and under this condition, rotating the elastic grinding stone wheel by the second drive means to grind the oil seal fit portion.

Here, the elastic grinding stone is manufactured, for example, by mixing, pressure forming, and baking a mixture of abrasive grains such as diamond particles, aluminum oxide particles, cerium oxide particles, or silicon oxide with non-rigid plastic granules serving as a binding agent such as polyvinyl alcohol, polyurethane, or porous fluorocarbon resin (e.g., polytetrafluoroethylene). The rotating grinding stone can be shaped, e.g., such that an annular elastic grinding stone is secured to a disk-shaped grinding stone base, that a disk-shaped elastic grinding stone is secured to a disk-shaped grinding stone base, or that a cylindrical elastic grinding stone is secured to the outer circumference of a disk-shaped grinding stone base. The edge face of the elastic grinding stone may be employed as the abrasive face, or alternatively a peripheral side of the elastic grinding stone may also be employed as an abrasive face.

Since the present invention employs an elastic grinding stone, elastic bodies carrying abrasive grains operate resiliently, thereby allowing projected abrasive grains to be resiliently displaced flush with the face and thus the projections and depressions of the grinding stone to be averaged. Since this causes the load between the workpiece and the elastic grinding stone to be reduced, it is possible to prevent the abrasive grains from causing chipping, thereby providing grinding without the chipping that may lead to concentration of stress due to heat or degradation in bending strength. Since a reduced load can also serve to reduce the rotational speed of the grinding stone, heat to be generated on the workpiece and grinding stone is reduced, thereby eliminating the need for using cooling water. It is thus made possible to provide dry grinding (grinding without using liquid such as water) which is suitable for grinding a workpiece having an already processed portion to which dust particles or water are not desired to adhere.

According to the present invention, use of the elastic grinding stone makes it possible to remove a turning lead portion by dry grinding without causing grinding burning. Additionally, the grinding causes only an extremely reduced amount of dust particles without the need of providing facilities for grinding fluid, thereby cutting the costs of the facilities and electricity charges therefor, which would be otherwise required. It is also possible to solve those problems such as deterioration of work environment due to scattering of grinding fluid or with the treatment of used fluids.

Additionally, the grinding apparatus can be readily incorporated into a typical lathe. This allows for freely selecting within the lathe either only processing for finish cutting of quenched steel or processing for finish cutting of quenched steel followed by removal of a turning lead portion with the elastic grinding stone. This selection may vary. For example, even for those axial workpieces that are used with constant velocity joints of the same type, it may depend on the type number thereof whether or not their turning lead portions have to be removed. However, regardless of such cases, it is possible to process those axial workpieces in the same line, thereby providing reductions in manufacturing costs through shared use of a line.

DETAILED DESCRIPTION OF THE INVENTION

Figure 1:
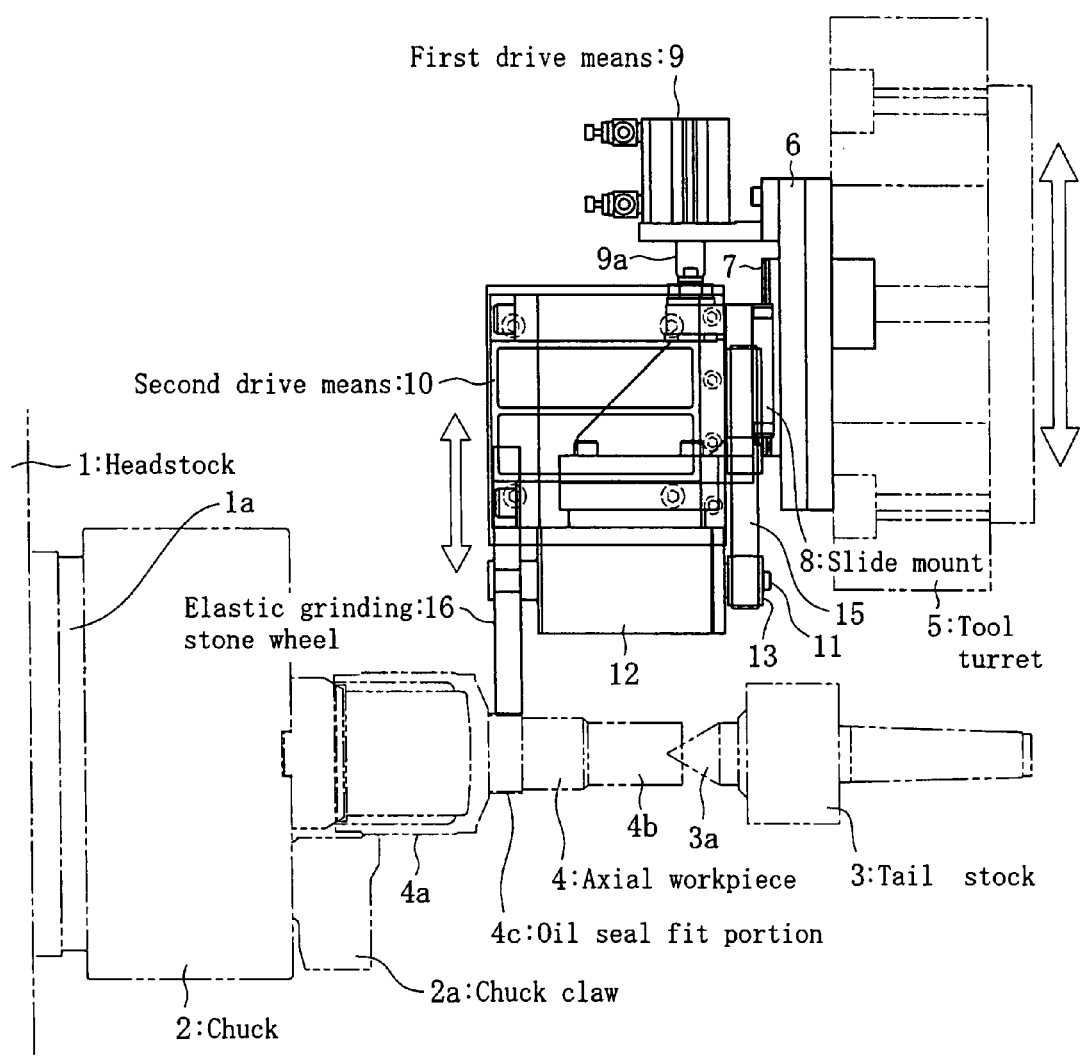
FIG. 1 is a plan view illustrating a grinding apparatus in accordance with the present invention.
Figure 2:
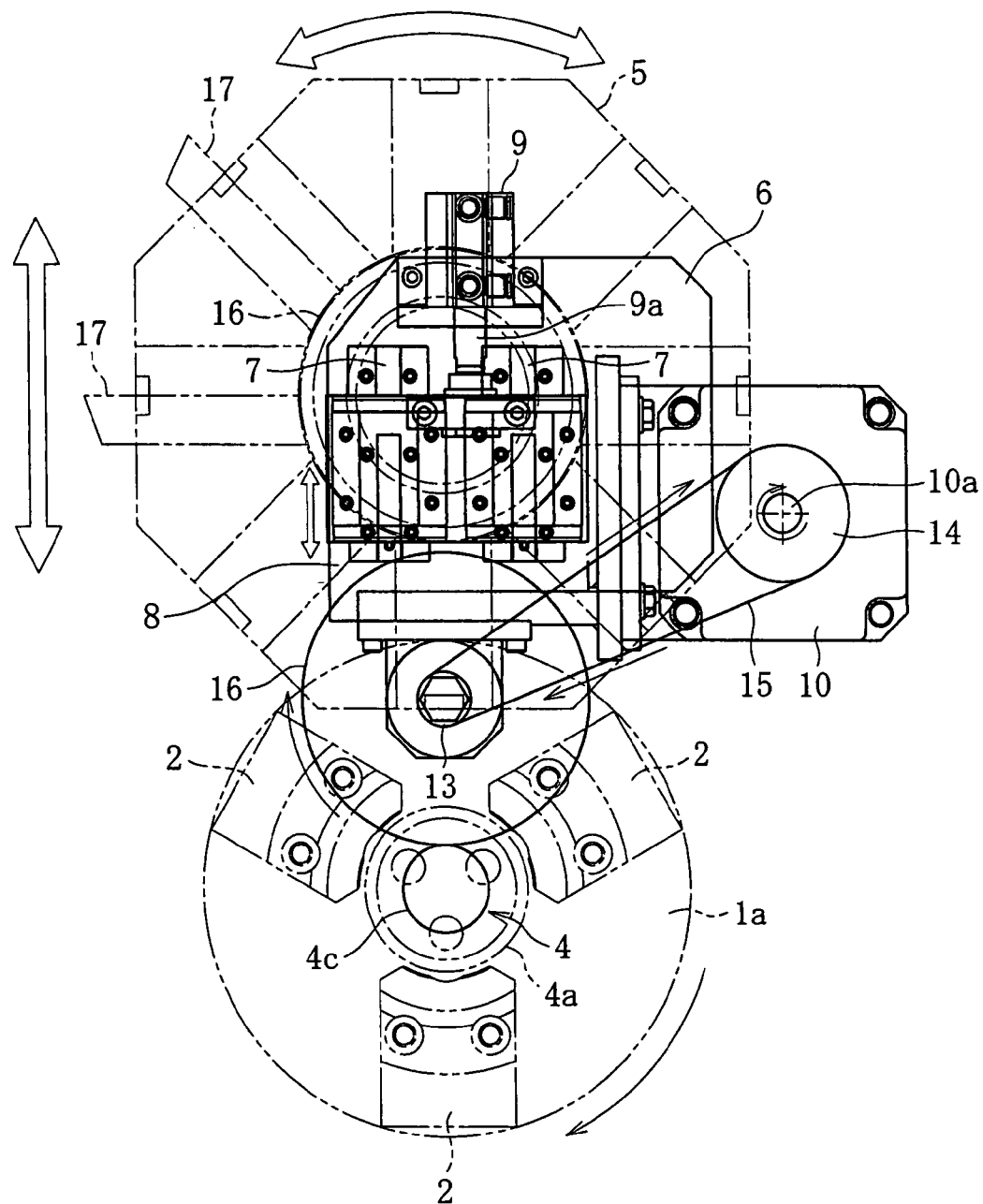
FIG. 2 is a side view illustrating the grinding apparatus in accordance with the present invention.

The present invention will now be described below with reference to the accompanying drawings in accordance with the embodiment. In FIGS. 1 and 2, there are shown a headstock 1 of a lathe, a three-claw chuck 2 attached to a main shaft 1a of the headstock 1, and a tail stock 3 opposing to the headstock 1. Note that other components such as a bed on which the tail stock 3 is installed are not illustrated in these drawings.

In this embodiment, illustrated as an exemplary axial workpiece having an oil seal fit portion on its outer circumferential surface is an outer joint member 4 of a sliding-type constant velocity universal joint. One end of the outer joint member 4 has a shape of a shaft attached cup in which a tip portion of the chuck 2 is fit into the inner diameter of a cup portion 4a and the outer diameter of the cup portion 4a is securely held with a chuck claw 2a. On the other hand, a center 3a of the tail stock 3 abuts against the center of the tip portion of a shaft portion 4b or the other end of the outer joint member 4. In this way, the outer joint member 4 is centered.

Above or on a side of the bed of the lathe, there is provided a tool turret 5 which has a shape of a regular octagonal plate and is made movable by means of a lift drive mechanism or a forward and backward drive mechanism (not shown). The tool turret 5 is coupled at its center with an indexing rotational shaft (not shown) in parallel to the main shaft 1a. The tool turret 5 is capable of accommodating around it up to eight types of tools at the same time. This arrangement allows the tool turret 5 to be rotationally indexed for replacement for a desired tool, so that required processing is performed on a workpiece being rotated by the main shaft 1a.

A square base plate 6 is bolted to the front of the tool turret 5. As illustrated, a plurality of vertically directly moving guides 7 is provided in parallel on the base plate 6. A slide mount 8 is attached slidably to the directly moving guides 7. The slide mount 8 is coupled to an air cylinder (first drive means) 9 installed at an end of the base plate 6 so as to move up and down by expansion and contraction movement of the air cylinder 9. When the position of the slide mount 8 is about to reach the extreme position of retreat, it is sensed by a sensor (not shown). The air drive circuit for the air cylinder 9 is provided with a relief valve, so that when a predefined or greater load acts upon a piston 9a of the air cylinder 9, air is relieved through the relief valve to permit retreat of the piston 9a. The slide mount 8 is provided with a brushless motor (second drive means) 10 having a rotational shaft 10a that is parallel to the main shaft 1a, and a spindle 11 in parallel to the rotational shaft 10a of the motor 10. A bearing 12 of the spindle 11 is secured to the slide mount 8.

A belt 15 is looped over between a smaller pulley 13 attached to one end of the spindle 11 and a larger pulley 14 attached to the rotational shaft 10a of the motor 10. The other end of the spindle 11 is coupled with an elastic grinding stone wheel 16 at the center thereof. The elastic grinding stone wheel 16 is installed to the slide mount 8 in a manner such that the center of the elastic grinding stone wheel 16 is flush with the main shaft 1a of the lathe, at a rotationally indexing position of the tool turret 5 with the air cylinder 9 extended to the maximum.

The grinding apparatus is configured as described above, and is used to perform turning and grinding on an axial workpiece or the outer joint member 4 as follows.

First, the outer joint member 4 is placed between the main shaft 1a and the center 3a, and then the outer diameter of the outer joint member 4 is firmly held with the chuck 2. Under this condition, the main shaft 1a is rotated, thereby allowing the outer joint member 4 to be rotated.

When the outer diameter surface of the outer joint member 4 is cut by turning, the tool turret 5 is rotationally indexed to direct the desired cutting tool 17 toward the outer joint member 4 with its cutting edge placed downwardly. Under this condition, the tool turret 5 is moved downward to bring the cutting edge of the cutting tool 17 into contact with the outer diameter surface of the outer joint member 4 to cut the outer diameter surface by turning.

Next, for example, to remove a turning lead portion of an oil seal fit portion 4c of the outer joint member 4 that has been formed by turning, the tool turret 5 is rotationally indexed to allow the elastic grinding stone wheel 16 to move down to the lower limit position as well as the air cylinder 9 to extend to its maximum. With the air cylinder 9 extended to its maximum, the slide mount 8 is located at the most advanced position relative to the base plate 6 or the tool turret 5. Under this condition, the tool turret 5 is moved downwardly at a low speed to bring the lower edge of the elastic grinding stone wheel 16 into contact with the oil seal fit portion 4c of the outer joint member 4. Then, the oil seal fit portion 4c starts to be ground.

Even during grinding of the oil seal fit portion 4c, the tool turret 5 continues to be moved downward at a constant velocity. At this time, the piston 9a of the air cylinder 9 is pushed into the main body of the air cylinder by an amount equivalent to the amount of the downward movement of the tool turret 5. An extra amount of air in the air cylinder body is released through the relief valve. As a result, the elastic grinding stone wheel 16 is kept in contact with the outer diameter surface of the outer joint member 4 all the time at a constant optimum pressure, thereby providing a good grinding operation.

Immediately before the piston 9a of the air cylinder 9 is retreated for the slide mount 8 to reach the extreme position of retreat, the tool turret 5 stops moving downward in accordance with a signal from the sensor that detects the slide mount 8 being about to reach the extreme position of retreat. After a certain duration of this stoppage, the air cylinder 9 is retreated by a remaining last amount of retreat, and the elastic grinding stone wheel 16 is separated away from the outer joint member 4. After that, the outer joint member 4 is dislodged from the main shaft 1a, and then the grinding step is ended. It was confirmed that through this grinding step, the turning lead portion was completely removed, and thus a high-quality finished surface was obtained which was equivalent to those obtained by conventional grinding.

Although the present invention has been described above in accordance with the embodiment, the present invention is not limited the embodiment, and a variety of modifications can be made thereto without departing from the scope and spirit of the present invention.

What is claimed is:

1. An apparatus for grinding an axial workpiece, the apparatus comprising:

a headstock of a lathe for rotatably supporting the axial workpiece about an axis thereof;

a tool turret disposed so as to be linearly movable in a radial direction with respect to the axis of the headstock;

a drive mechanism for linearly moving the tool turret in the radial direction;

a slide mount supported by the tool turret, the slide mount being disposed so as to be linearly movable in the radial direction with respect to the tool turret;

first drive means supported by the tool turret, the first drive means for linearly moving the slide mount in the radial direction;

an elastic grinding stone wheel supported by the tool turret and rotatably attached to the slide mount, the elastic grinding stone wheel disposed so as to be linearly movable in the radial direction with the slide mount; and second drive means supported by the tool turret, the second drive means for rotating the elastic grinding stone wheel, wherein the first drive means allows relative backward movement of the slide mount with respect to the tool turret when acted upon by a predefined or greater load.

2. A method for grinding an axial workpiece, the method comprising:

cutting an outer circumferential surface of the axial workpiece with a cutting tool attached to the tool turret of the apparatus according to claim 1;

rotating the tool turret to face the elastic grinding stone wheel towards the outer circumferential surface of the axial workpiece;

bringing the elastic grinding stone wheel into contact with the outer circumferential surface of the axial workpiece by moving the tool turret by the drive mechanism towards the outer circumferential surface of the axial workpiece with the first drive means, the first drive means allowing relative backward movement of the slide mount with respect to the tool turret when acted upon by the predefined or greater load, whereby the grinding wheel stone is maintained in a condition in which the grinding wheel stone is in contact with the outer circumferential surface of the axial workpiece at an optimum constant pressure; and under the condition, rotating the elastic grinding stone wheel by the second drive means to grind the outer circumferential surface of the axial workpiece.

\* \* \* \* \*